United States Patent [19]
Bond

[11] Patent Number: 5,101,622
[45] Date of Patent: Apr. 7, 1992

[54] AEROSPACE PROPULSION

[75] Inventor: Alan Bond, Oxfordshire, England

[73] Assignee: Rolls-Royce plc, London, England

[21] Appl. No.: 702,409

[22] Filed: Dec. 20, 1984

[30] Foreign Application Priority Data

Dec. 23, 1983 [GB] United Kingdom ............... 8334308

[51] Int. Cl.[5] .............................................. F02K 5/00
[52] U.S. Cl. ................................... 60/246; 60/270.1
[58] Field of Search ................. 60/246, 245, 206, 267, 60/270.1

[56] References Cited

U.S. PATENT DOCUMENTS

| 3,040,519 | 6/1962 | Rae | 60/246 |
|---|---|---|---|
| 3,308,626 | 3/1967 | Nelson | 60/246 |
| 3,327,400 | 3/1966 | Kuhrt | 60/246 |
| 3,327,401 | 3/1966 | Peters | 60/246 |
| 3,477,505 | 11/1969 | McGann | 60/246 |
| 3,705,496 | 12/1972 | Wolf et al. | 60/267 |
| 3,747,339 | 7/1973 | Wolf et al. | 60/206 |
| 3,775,977 | 12/1973 | Builder et al. | 60/260 |

FOREIGN PATENT DOCUMENTS

| 758403 | 10/1956 | United Kingdom . |
| 999581 | 7/1965 | United Kingdom . |
| 1055625 | 1/1967 | United Kingdom . |
| 1213497 | 11/1970 | United Kingdom . |

Primary Examiner—Donald P. Walsh
Attorney, Agent, or Firm—Cushman, Darby & Cushman

[57] ABSTRACT

An engine for application to the propulsion of aerospace vehicles (terrestrial or orbital) capable of operating in two propulsive modes. The first mode employs liquid hydrogen to pre-cool the intake air of a turbocompressor in order to deliver it at high pressure to a rocket type combustor/nozzle assembly. In this mode the external atmosphere is the source of oxidizer for the fuel. At a high Mach number in the hypersonic regime the engine changes to the second mode which is a conventional high performance rocket engine using liquid oxygen carried on the vehicle to oxidize the liquid hydrogen fuel. Both modes of propulsion use common hardware, namely the liquid hydrogen pump and the combustor nozzle assembly.

31 Claims, 6 Drawing Sheets

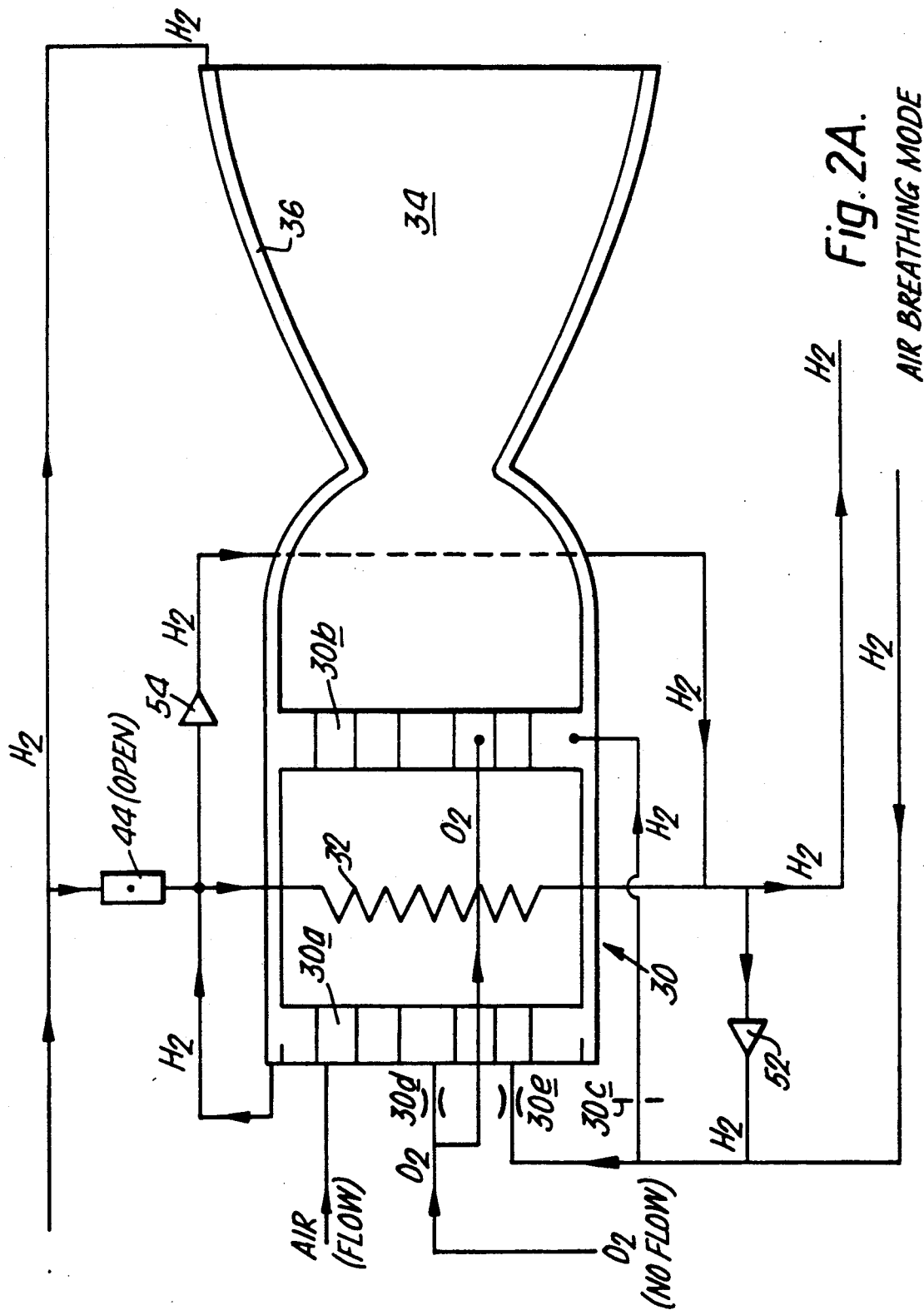

ROCKET MODE

Fig. 5.

EFFECTIVE EXHAUST VELOCITY (km/s) vs MACH. NO.

COMBUSTION EFF. – 0.99
NOZZLE EFF. – 0.97

AEROSPACE PROPULSION

This invention relates to the propulsion of aerospace vehicles for near earth and low earth orbit operations.

The propolsion of vehicles at high velocity in order to either minimise earth transit time or effect orbital insertion, currently depends upon either using the atmosphere as the propulsive reaction mass or use of a vehicle contained reaction mass expelled in the propulsion process (a propellant). The former types of engine are typically gas turbines or ramjets and the latter rockets.

Gas turbines may be self running from ground level and zero forward speed but are limited in flight by conditions in the compressor to speeds below Mach 3.5 due to inter alia, very high air inlet tempeeatures. Ramjets operate satisfactorily only at supersonic speeds from about Mach 2 to Mach 8 or so. Rockets have no speed limitations but have specific fuel consumption (fuel flow/thrust ratio) ten times worse than the former engine types in the overlapping regimes of performance. The desire to construct high speed vehicles has necessitated consideration of placing two or more types of power plant on the same vehicle in order to achieve the performance goal, but generally the additional engine mass carried offsets the performance gains of the combination. The use of the pure rocket for orbital insertion has necessitated the use of staged rockets even with the most powerful of the practical chemical propellant combinations (liquid oxygen/liquid hydrogen). In addition to these technical problems, the development cost of ramjets is prohibitively high, due to the necessity of expensive hypersonic wind tunnel test facilities, as the engine will only operate at high speed.

Liquid hydrogen is a very effective fuel yielding 2.8 times the energy of the equivalent mass of kerosine when burned with air. In addition it has a very low storage temperature ($-252°$ C. at 1 atmosphere vapour pressure) and a very high specific heat in the gas/vapour phase (14430 J/Kg°C.). It is therefore possible to utilise it as a fuel and also as a heat sink for thermodynamic cycles aimed at conditioning the incoming air to an airbreathing engine prior to passing it through the compression and combustion processes.

Three engine systems which have proposed to use hydrogen in this manner are, the liquid air cycle engine, the inverted turbojet and the pre-cooled turbojet.

The first shows inadequate performance gain, the second is incapable of ground start and self sustained subsonic operation and the third has high mass although it offers good high speed performance and has ground running capability.

The present invention embodies the essential features of gas turbine compressor technology, high pressure liquid bipropellant rocket technology and hydrogen heat sink concepts in a single engine.

Accordingly the present invention provides an aerospace vehicle propulsor comprising combustion means and propelling nozzle means arranged to receive the products of combustion from the combustion means and to eject the said products to propel the vehicle, the combustion means being arranged to receive either fuel and compressed air, which had been cooled prior to compression by heat exchange with the hydrogen fuel in liquid form, or fuel and liquid oxidiser, via valve means to control the flows of air, fuel and oxidiser, and heated fuel.

In particular, the present invention provides an aerospace vehicle propulsor comprising a combustion chamber with an associated heat exchanger, a propelling nozzle with an associated heat exchanger, a liquid hydrogen pump, a liquid oxidiser pump, a fuel and oxidiser pump driving turbine, an air compression section including in flow series a first heat exchanger, a second heat exchanger, a low pressure compressor driven by a low pressure turbine and high pressure compressor driven by high pressure turbine, the propulsor being capable of operating in two modes, in the first mode the propulsor acts as an air breathing engine to accelerate the vehicle from rest to a velocity of up to Mach 6.0, the liquid oxidiser being prevented from flowing to the combustion chamber by an oxidiser control valve, liquid hydrogen being pumped at high pressure via a first fuel control valve through the heat exchangers of the air breathing section in heat exchange relationship with the intake air to cool the intake air prior to compression in the low and high pressure compressors, the hydrogen fuel then being supplied to the combustion chamber heat exchanger via a second fuel control valve, the compressed air being supplied to the combustion chamber via a compressed air control valve, the fuel being heated in the combustion chamber heat exchanger by heat exchange with the combustion products and the heated fuel being used to drive the fuel and oxidiser pump turbine, a portion of the exhause from the said pump turbine passing via a third fuel control valve to drive the turbines of the air compressors and vented to atmosphere through an exhaust nozzle, the remainder of the fuel passing to the combustion chamber to be burnt with the compressed air, the combustion products exhausting through the propelling nozzle to provide the propulsive force, in the second mode the propulsor acts as a pure rocket engine, the second fuel control valve being closed to direct liquid fuel through the propelling nozzle heat exchanger to the pump turbine, the third fuel control valve being closed to prevent the fuel from flowing to the air compressor driving means, and the compressed air control valve being closed to prevent the flow of compressed air to the combustion chamber, the liquid oxidiser control valve being operated to allow liquid oxidiser to flow to the combustion chamber to react with the hydrogen, the products of combustion exhausting though the propelling nozzle to provide the propulsive force to accelerate the vehicle from a speed of Mach 6.0 to the desired speed.

This engine is capable of test bed development and ground running. It performs airbreathing operation to a high speed in the hypersonic regime whereupon it changes its mode of operation to that of a rocket using a high energy oxidiser and the hydrogen fuel. The engine mass is sufficiently low to enable a hypersonic terrestrial vehicle or a single stage earth to low orbit vehicle to be realised without recourse to expendible hardware to the process.

In essence the hydrogen fuel and the intake air in the airbreathing mode are regarded as a single thermodynamic system, the fall in entropy, of which, due to compresion of the air, is offset by the gain in entropy of the hydrogen by its rise in temperature. In addition the total thermal capacity of the air/hydrogen system is used to absorb the kinetic energy of the intake air at high flight Mach numbers, as enthalpy rise in the fluid, thereby limiting cycle peak temperatures to values within current technology. Unless vehicle considerations dictate an earlier airbreather/rocket transition it is the thermal capacity of the working fluids, and materials technology limits which dictate the Mach number at which this will occur. Currently with standard technology this would be around Mach 6. By arranging the air delivery pressure to be at values equivalent to those in rocket engines and selecting a hydrogen flow in accordance with thermodynamics rather than combustion requirements, it proves possible to use a single combustion system/expansion nozzle and a single hydrogen turbopump for both propulsive phases. During the airbreathing phases the oxidiser pump is unused and in the rocket phase the intake air/liquid fuel exchangers and air compressors are inoperative by operation of the respective valves.

The invention will now be more paricularly described by way of reference to the accompanying drawings in which:

FIG. 1 is a diagrammatic representation of one form of engine according to the present invention, FIG. 2A is a representation of the combustion chamber and propelling nozzle of the engine shown in FIG. 1, in the air breathing mode, FIG. 2B is a view similar to FIG. 2A but showing the combustion chamber and propelling nozzle in the rocket mode, FIG. 3 is a representation of an alternative form of intake heat exchanger to that shown in FIG. 1.

FIG. 5 is a plot of effective engine exhaust velocity v. Mach No. indicating a typical engine performance.

Figure 1:
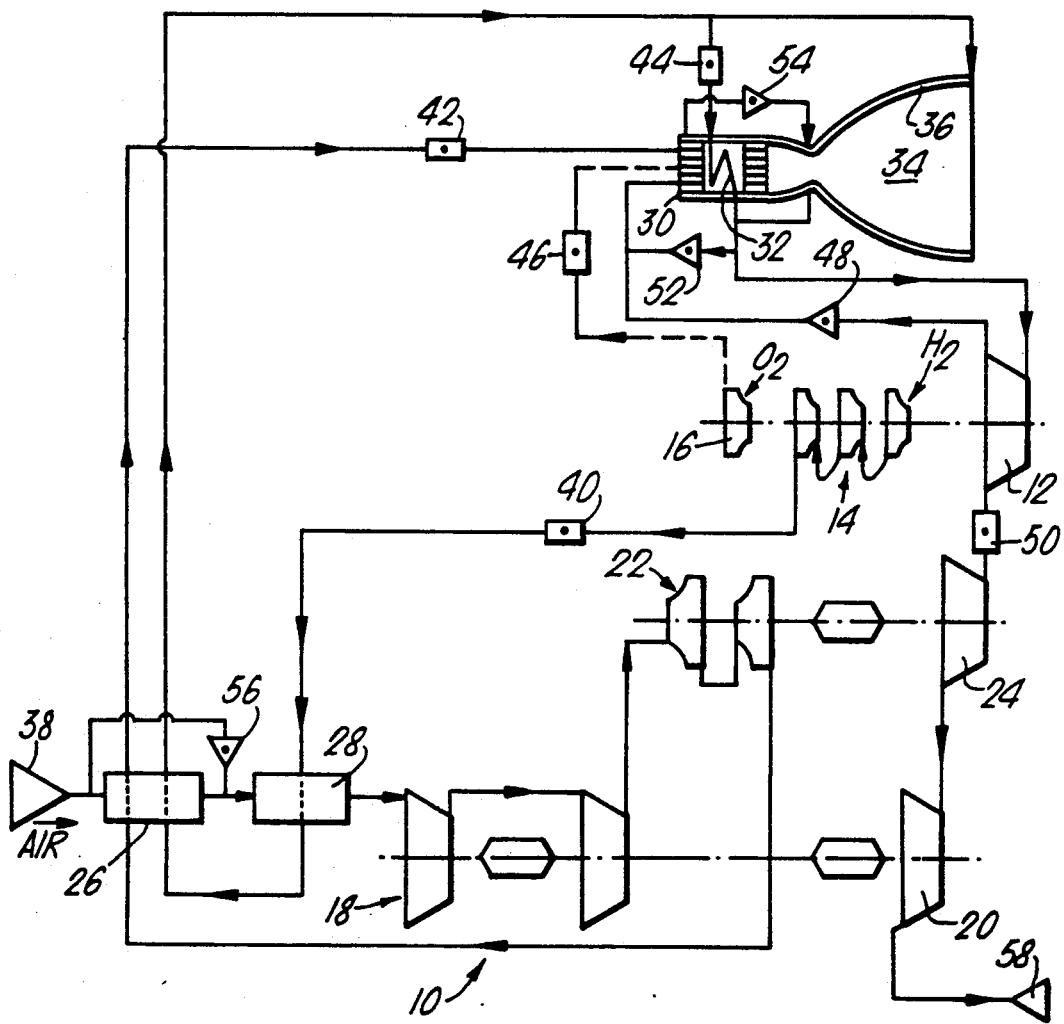

Referring to FIG. 1, an aerospace vehicle engine or propulsor 10 comprises a pump turbine 12 driving a liquid hydrogen pump 14 and a liquid oxidiser pump 16, a low pressure compressor 18 driven by a turbine 20, a high pressure compressor 22 driven by a turbine 24, two air intake heat exchangers 26 and 28, a combustion chamber 30 with an associated heat exchanger 32, and a propelling nozzle 34 with an associated heat exchanger 36. The heat exchangers 26, 28 receive intake air through a supersonic intake 38 (FIG. 4), and liquid hydrogen via a stop valve 40. The most upstream heat exchanger 26 also receives compressed air from the compressor 22 which then flows to the combustion chamber 30 via a stop valve 42. The hydrogen fuel after passing through the heat exchangers 26, 28 flows to the combustion chamber heat exchanger 32 in a gaseous form via a stop valve 44 and the propelling nozzle heat exchanger 36.

The heat exchanger 32 is arranged to allow heat from the products of combustion to be transferred to the liquid hydrogen either directly through heat exchanger elements or indirectly through the cooling jacket of the chamber whilst the flow of hydrogen through the heat exchanger 36 cools the wall of the propelling nozzle and heats the hydrogen.

The heated hydrogen from the heat exchanger 32 and/or the hydrogen from the heat exchanger 36, depending upon engine mode, drive the pump turbine 12 which drives the pumps 14 and 16, the liquid oxidiser flowing to the combustion chamber 30 via a stop valve 46. The exhaust from the turbine 12 is divided into two flows, one to the combustion chamber via a control valve 48, and the other to the turbines 24, 20 via a stop valve 50.

A power control valve 52 allows heated hydrogen to flow directly into the combustion chamber, and a temperature control valve 4 controls the flow of heated hydrogen from the heat exchanger 36 into the hydrogen flowing to the pump turbine 12.

A control valve 56 allows intake air to by-pass the upstream heat exchanger 26 and to flow directly into the heat exchanger 28.

The engine 10 is capable of operating in two modes, one in which the engine is air breathing and is used to accelerate the aerospace vehicle to a velocity at which the engine is switched to operate in a rocket mode.

For the initial acceleration of the aerospace vehicle up to the transition Mach number the engine is operated in its airbreathing mode and the oxidiser pump 16 is isolated from the cycle by closing valve 46 whilst valves 40, 42, 44 and 50 are open. The cycle operation for this mode will now be described.

The liquid hydrogen pump 16 takes fuel from the vehicle tanks and raises its pressure, typically to several hundred bar, at the delivery. The hydrogen is then passed to the heat exchanger 28 and then to the heat exchanger 26 thereby pre-cooling the intake air entering the compressor 18. The low temperature air, typically $-190°$ to $170°$ C. is compressed via compressors 18 and 22 to a delivery pressure of several hundred bars and a temperature typically $130°$–$230°$ C.

The relatively cool, high pressure air is passed through the heat exchanger 26 to assist the hydrogen to pre-cool the intake air at high Mach numbers. At low Mach numbers the intake air is by-passed around heat exchanger 26 via a control valve 56 in order to reduce the pressure losses at the compressor inlet.

Figure 2B:
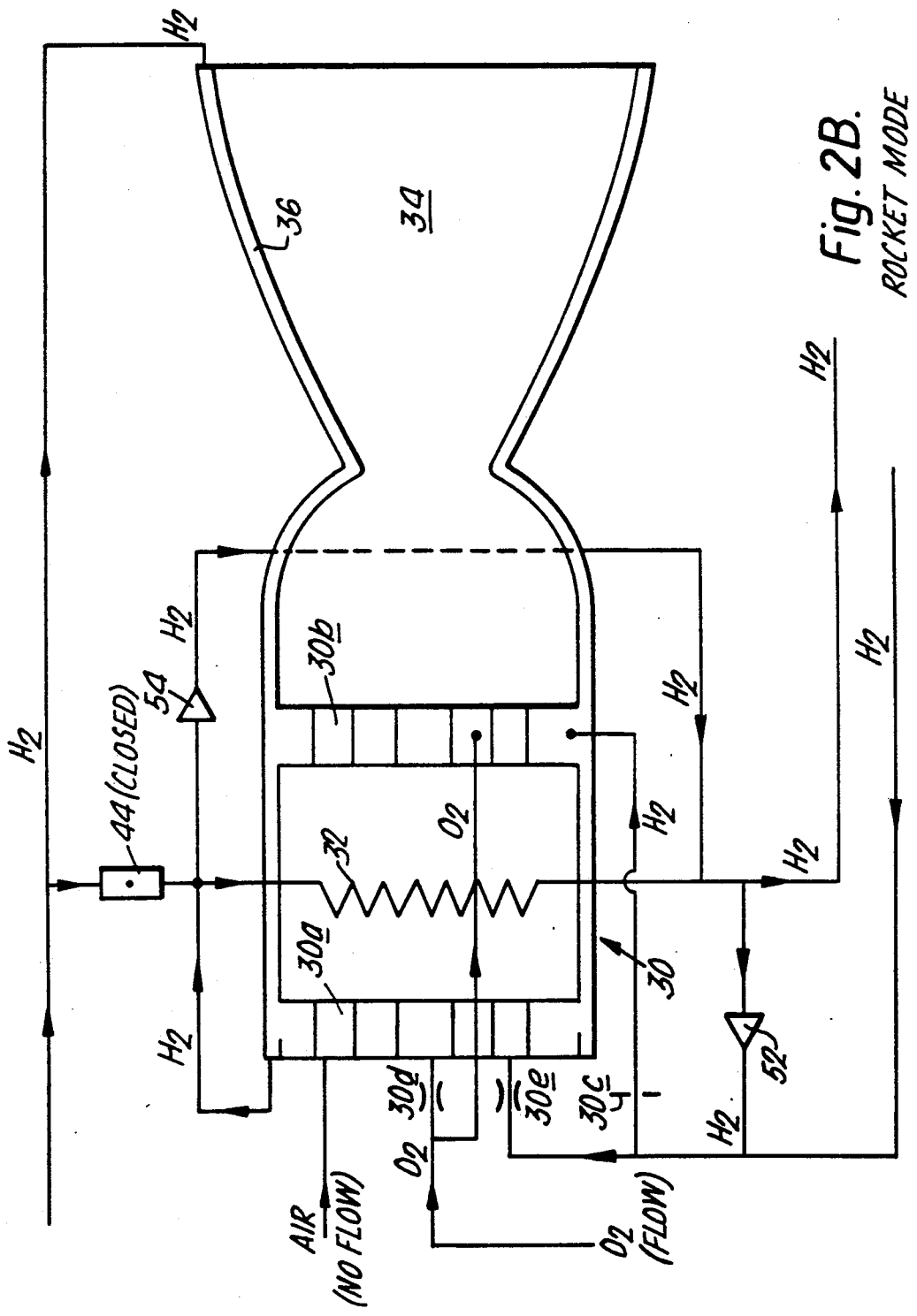

The high pressure air from heat exchanger 26 is passed to the combustion chamber 30 where combustion with a majority of the hydrogen in a pre-burner 30a (FIG. 2A) produces high temperature exhaust products for propulsion. A small flow of hydrogen passes to a main burner 30b via a restrictor 30c to keep the main burner cool in this mode. The high pressure hydrogen from heat exchanger 26 is passed through the heat exchanger 32 in the combustion chamber 30 to heat it typically to $650°$ C. A by-pass valve 54 enables the hydrogen temperature to be controlled. From the combustion chamber 30 the hot hydrogen is passed through the turbine 12 to drive the hydrogen pump 14. At the exit from turbine 12 some hydrogen is passed back to the combustion chamber 30 for use as the fuel for combustion with air, whilst the remaining hydrogen is passed through turbines 24 and 20 for the purpose of driving compressors 22 and 18. The hydrogen at the exit from turbine 20 is vented overboard through a propelling nozzle 58 to derive additional thrust from this exhaust.

The power level at which this engine operates can be controlled via by-pass valve 52 which modulates the flow and hence the output power of turbine 12. At the transition Mach number, valves 42, 50 and 44 are closed and 46 is opened (see FIG. 2B). This effectively isolates the airbreathing portion of the engine and reconfigures it as a high performance expander cycle rocket engine of a well known type. Both the pre-burner 30a and the main burner 30b are supplied with liquid oxidiser and hydrogen, the proportions to the respective burners being controlled by restrictors 30d and 30e. The pre-burner receives just enough oxidiser to maintain a pre-burner temperature of approximately $1000°$ C. whilst the main burner operates at approximately $3600°$ C. The specific function of 44 is to direct fuel into regeneratively cooling the combustion chamber in the rocket mode, ie., in heat exchanger 36. Film cooling may effectively be employed in the airbreathing mode with some saving in desired hydrogen pump delivery pressure. Film cooling would not be desirable for performance considerations in the rocket mode. In the rocket mode it may be necessary to alter the turbine back pressure on 12 by use of, a control valve 48.

The hardware required to implement this invention is in general relatively standard gas turbine and rocket engine technology. The relatively low turbine temperatures in turbines 24 and 20 expedite further weight savings by use of light alloys.

In order to match the performance of compressors 18 and 22 with turbines 20 and 24 it may be necessary to employ partial admission or re-entrant turbines. Alternatively, a gearbox could be employed with small high speed full admission machines. In the interests of weight and reliability it may be easier to sacrifice some small loss in performance and run the turbines away from optimum conditions with full admission and direct drive couplings to the compressors. For example, the turbines 20 and compressors, 20, 24 and 18, 22 respectively can be arranged as a twin spool system, which is a well known concept in gas turbine design. For all variants the technology has been well explored. The turbines would probably have velocity compounded impulse stages.

The heat exchangers require considerable technological development to achieve reliable flight weight hardware. A design has been examined of the cross-counter flow serpentine tube type using small bore tubes (1.0 to 0.5 mm diameter) with very thin walls (0.05 to 0.025 mm thick), made from nickel alloys (for example Inconel 625). Such heat exchangers have a very short depth in the direction of the low pressure air flow, (about 50 mm) and present a large area normal to the flow. It is therefore necessary to fold them in order to reduce the engine frontal area. This increases the intake length, but in practice should not present significant vehicle integration problem. Designs of this type are forced by the requirement for low pressure loss to the air compressor inlet. Alternative designs of heat exchanger can be used based on existing heat exchanger designs employing arrays of spiral tubes.

Figure 4:
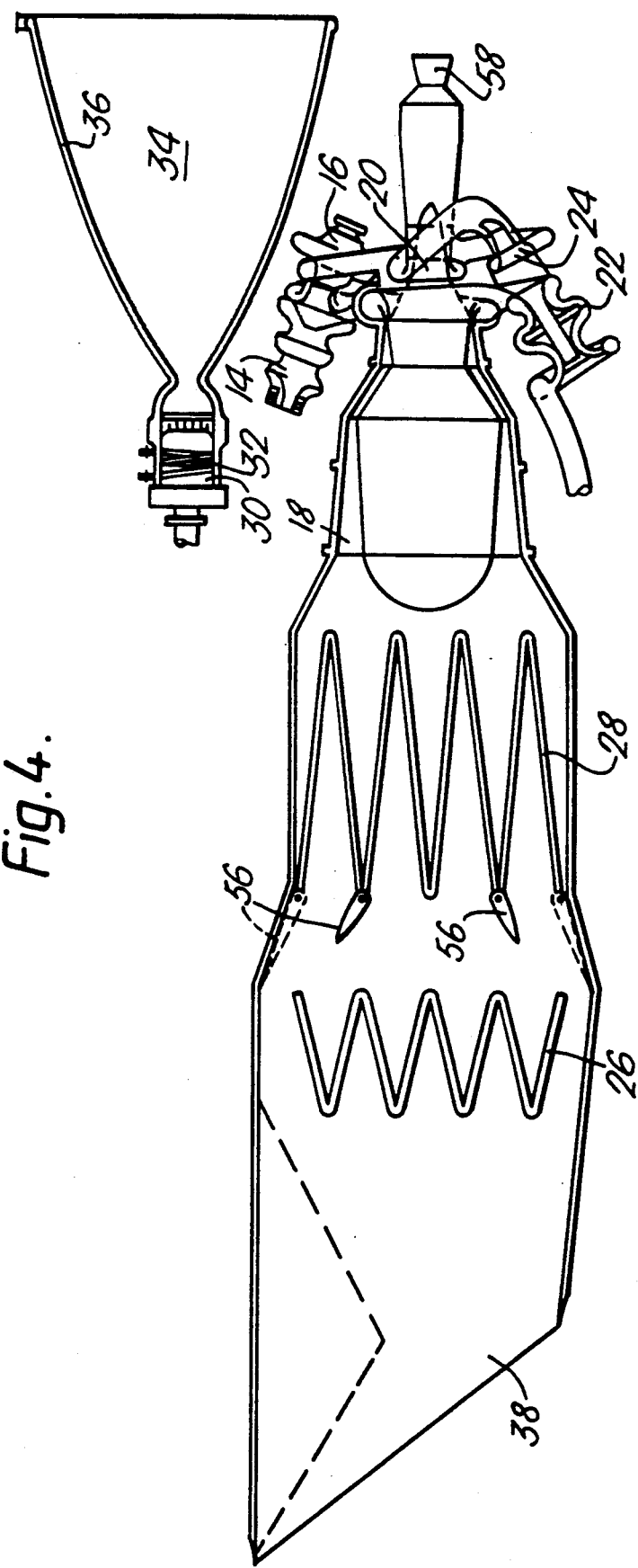
FIG. 4 shows a conceptual engine layout.

Referring to FIG. 4. This shows a possible configuration of engine components. These would be arranged in practice to integrate with the vehicle airframe.

Referring to FIG. 5. This shows the variation of the effective exhaust velocity of an in-line engine arrangement against Mach number. A constant effective airspeed of 500 knots was employed for the calculation and the intake momentum drag is also included. This parameter when multiplied by propellant flow from the vehicle gives the engine thrust. It will be noted that during the airbreathing mode values range from 23300 m/s to 13100 m/s. These should be compared with approximately 4550 m/s for liquid oxygen/liquid hydrogen rockets. The thrust to weight ratio of the engine in airbreathing mode may range from 14:1 to 20:1 depending on the trajectory demands and in rocket mode may range from 30:1 to 40:1. These values compare well with lift jet engines (16.1) and pure rocket engines (65:1 to 100:1).

The particular embodiment described is one of a class of devices employing the principle of air compression under (ideally) isentropic conditions for the system comprising fuel and air with a view to overcoming thermal limitations on simpler cycles using isentropic processes on a single fluid. The embodiment above has been developed for its simplicity. In principle compression of air could begin at any compressor inlet temperature and heat rejection could take place from compressor intercoolers to a hydrogen driven turbine cycle. Such a cycle would have many more heat exchangers, compressor stages and turbine stages and increased work flow, but it may have advantages in avoiding very low air temperatures.

Figure 3:
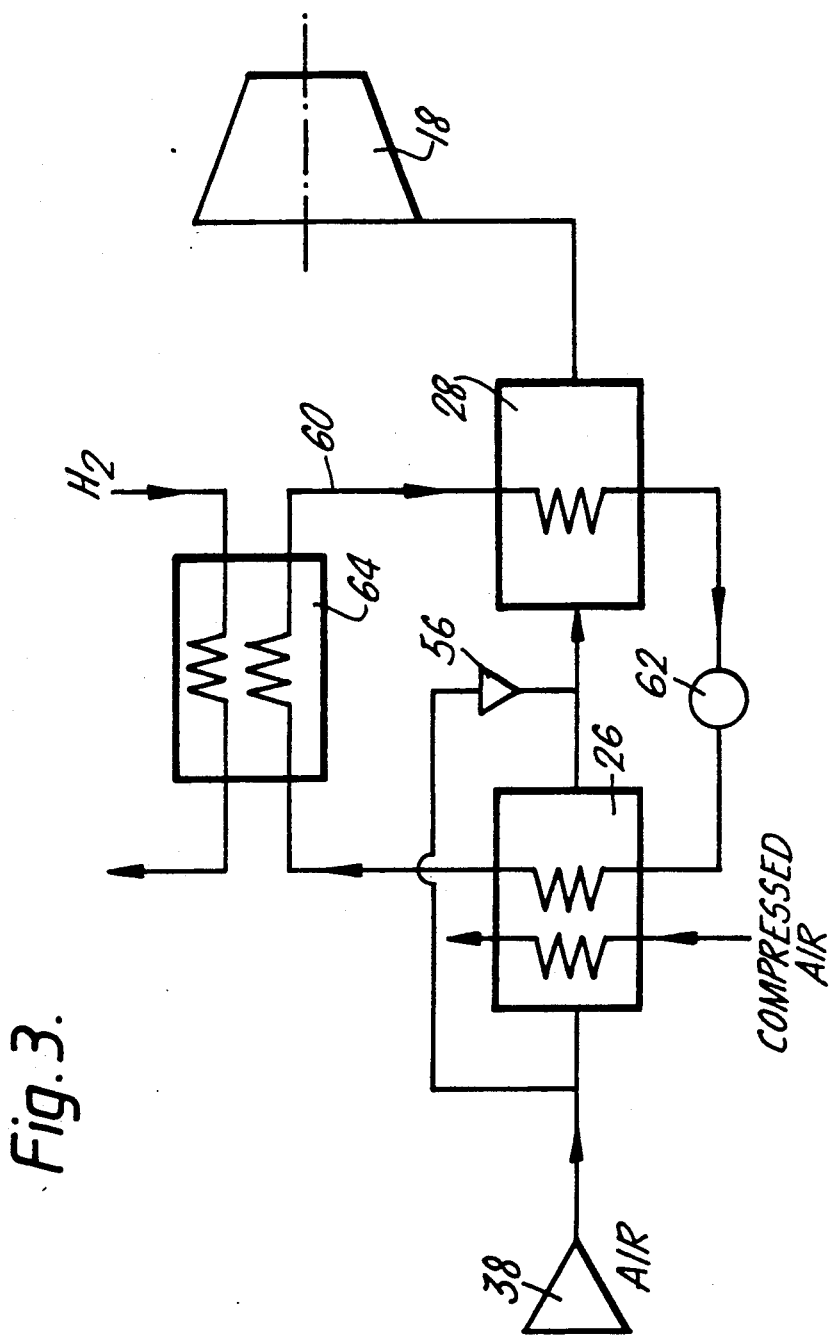

In the embodiment described both of the working fluids are employed directly in the heat exchangers 26 and 28 to pre-cool the intake air. An alternative would be to employ either one of the working fluids (hydrogen or air) to act as a thermal transport loop from the heat exchangers 26 and 28 to an additional heat exchanger with the other fluid. After transferring the heat the coolant fluid could then be returned to heat exchangers 26 and 28 for further heating. An extension of design as shown in FIG. 3 would be to employ a thermal transport loop from heat exchangers 26 and 28, with a fluid and not a propellant totally contained within a loop 60 driven by a pump 62 coupled with a further heat exchanger 64 in the propellant circuit for heat rejection. This type of solution might be employed to avoid having hydrogen and air in the same heat exchanger if such a design proved troublesome.

Referring to FIG. 1. The turbine flow heat addition means 32 shown as a heat exchanger in the precombustor 30 could be replaced by an auxilliary burner employing fuel and air with the penalty of a more severe control problem as the enthalpy of the air rises as the Mach number increases.

In a further arrangement, the turbine driving medium can comprise a flow of gas tapped from the combustion chamber at a suitable temperature and pressure. This technique is known form existing rocket technology. Such an arrangement would avoid the need for an auxiliary burner or a heat exchanger.

In addition to the performance as described, additional propulsive gains are possible by using the hydrogen rich turbine exhaust in an auxilliary propulsion device such as a reheated by-pass duct or external ramjet nozzle.

I claim:

1. An aerospace vehicle propulsor comprising combustion means and propelling nozzle means arranged to receive the products of combustion from the combustion means and to eject the said products to propel the vehicle, first means for supplying fuel and compressed air to said combustion means and second means for supplying liquid fuel and liquid oxidizer to said combustion means, control means for selectively operating said first and second means so that when one of said means is operating the other is deactivated, said propulsor including heat exchange means for cooling the air, prior to compression thereof, by heat exchange with one of the fuel while in liquid form, on the one hand, and liquid fuel and liquid oxidizer, on the other hand, said control means including valve means for controlling the flows of air, fuel and oxidizer and heated fuel.

2. A propulsor as claimed in claim 1 comprising air and liquid fuel heat exchange means, air compression means, and turbine means arranged to drive the air compression means, the heat exchange means being arranged to receive ambient air in heat exchange relationship with high pressure liquid fuel and to discharge the cooled air to the compression means, the compression means discharging the pressurised and cooled air to the combustion means.

3. A propulsor as claimed in claim 2 in which the heat exchange means comprises at least two heat exchangers, the most upstream heat exchanger being arranged to receive the intake air in heat exchange relationship with the high pressure liquid fuel and the discharge from the air compression means, and having valve means to selectively allow the intake air to pass through all the heat exchangers of the heat exchange means or to be diverted from passing through the most upstream heat exchanger depending upon the flight Mach number of the vehicle.

4. A propulsor as claimed in claim 2 in which the air compression means comprises a low pressure compressor and a high pressure compressor, each being driven via a respective shaft by a low pressure turbine and a high pressure turbine.

5. A propulsor as claimed in claim 4 in which the low pressure compressor is a multi-stage axial compressor and the high pressure compressor comprises a multi-stage centrifugal compressor.

6. A propulsor as claimed in claim 5 in which the low and high pressure compressors are mounted on co-axial shafts.

7. A propulsor as claimed in claim 1 having a liquid fuel pump and a liquid oxidiser pump, and turbine means for driving both said pumps.

8. A propulsor as claimed claim 7 in which the combustion means includes heat exchange means in which fuel is in heat exchange relationship with the products of combustion, the heated fuel being arranged to drive the turbine means of the fuel and oxidiser pumps, and the turbine means of the air compression means.

9. A propulsor as claimed claim 8 in which a portion of the heated fuel discharged from the pump turbine means is passed to the combustion means to be burnt either with compressed air or liquid oxidier.

10. A propulsor as claimed in claim 8 having a control valve to by-pass fuel around the heat exchanger of the combustion means.

11. A propulsor as claimed in claim 8 having a control valve to divert heated fuel from the combustion means heat exchanger away from the pump turbine means directly to the combustion means.

12. A propulsor as claimed in claim 8 having a control valve between the outlet of the pump turbine means and the inlet of the combustion means to control the back pressure on the pump turbine means.

13. A propulsor as claimed in claim 7 in which the liquid fuel is burnt with air in a combustor separate from the combustion means, the products of combustion being used to drive the pump turbine means and the air compression turbine means.

14. A propulsor as claimed in claim 7 in which the products of combustion are tapped from the combustion means at a suitable temperature and pressure to drive the pump turbine means and the air compression turbine means.

15. A propulsor as claimed in claim 1 in which the propelling nozzle means includes heat exchange means arranged to receive high pressure fuel in heat exchange relationship with the products of combustion, the fuel thereby being heated prior to combustion with the liquid oxidiser and the propelling nozzle being cooled.

16. A propulsor as claimed in claim 1 in which the valve means includes a stop valve between the liquid oxidiser pump and the combustion means;

17. A propulsor as claimed in claim 1 in which the valve means includes a stop valve between the pump turbine means and the turbine means driving the air compression.

18. A propulsor as claimed in claim 1 in which the valve means includes a stop valve downstream of the liquid fuel pump and upstream of the intake air heat exchange means.

19. A propulsor as claimed in claim 1 in which the valve means includes a valve between the fuel supply and the heat exchanger of the combustion means.

20. A propulsor as claimed in claim 1 in which the valve means includes a stop valve between the compressed air discharge from the heat exchange means and the combustion means.

21. A propulsor as claimed in claim 1 in which the fuel consists of hydrogen and the liquid oxidiser comprises any liquid oxidising agent such as oxygen.

22. An aerospace vehicle propulsor comprising a combustion chamber with an associated heat exchanger, a propelling nozzle with an associated heat exchanger, a liquid hydrogen pump, a liquid oxidiser pump, a fuel and oxidiser pump driving turbine, an air compression section including in flow series a first heat exchanger, a second heat exchanger, a low pressure compressor driven by a low pressure turbine and high pressure compressor driven by a high pressure turbine, the propulsor being capable of operating in two modes, in the first mode the propulsor acts as an air breathing engine to accelerate the vehicle from rest to a velocity of up to Mach 6.0, the liquid oxidiser being prevented from flowing to the combustion chamber by an oxidiser control valve, liquid hydrogen being pumped at high pressure via a first fuel control valve through the heat exchangers of the air breathing section in heat exchange relationship with the intake air to cool the intake air prior to compression in the low and high pressure compressors, the hydrogen in gaseous form then being supplied to the combustion chamber heat exchanger via a second liquid fuel control valve, the compressed air being supplied to the combustion chamber via a compressed air control valve, the fuel being heated in the combustion chamber heat exchanger by heat exchange with the combustion products and the heated fuel being used to drive the fuel and oxidiser pump turbine, a portion of the exhaust from the said pump turbine passing via a third liquid fuel control valve to drive the turbines of the air compressors and vented to atmosphere through an exhaust nozzle, the remainder of the fuel passing to the combustion chamber to be burnt with the compressed air, the combustion products exhausting though the propelling nozzle to provide the propulsive force, in the second mode the propulsor acts as a pure rocket engine, the second fuel control valve being closed to direct fuel through the propelling nozzle heat exchanger to the pump turbine, the third fuel control valve being closed to prevent the fuel from flowing to the air compressor driving means, and the compressed air control valve being closed to prevent the flow of compressed air to the combustion chamber, the liquid oxidiser control valve being operated to allow liquid oxidiser to flow to the combustion chamber to react with the liquid hydrogen, the products of combustion exhausting through the propelling nozzle to provide the propulsive force to accelerate the vehicle from a speed of up to Mach 6.0 to the desired speed.

23. A propulsor as claimed in claim 22 in which the air from the high pressure compressor also passes through the first heat exchanger in heat exchange relationship with the intake air.

24. A propulsor as claimed in claim 22 in which the first heat exchanger has by-pass controlled by an air intake valve to pass intake air directly to the second heat exchanger at low Mach numbers.

25. A propulsor as claimed in claim 22 in which a fourth fuel control valve is provided to by-pass the combustion chamber heat exchanger to pass a portion of the liquid fuel directly to the inlet of the pump turbine.

26. A propulsor as claimed in claim 22 in which a fifth fuel control valve is provided between the exhaust of the pump turbine and the inlet the combustion chamber in order to vary the back pressure on the pump turbine.

27. A propulsor as claimed in claim 22 in which a sixth fuel control valve is provided to apportion the flow of liquid fuel from the combustion chamber heat exchanger between the flow to the pump turbine and the flow directly to the combustion chamber.

28. A propulsor as claimed in claim 22 in which the compressor drive turbines are of the partial admission or re-entrant type.

29. A propulsor as claimed in claim 22 in which the compressor turbines are of the full admission type and drive the compressors through respective gearboxes of suitable speed ratios.

30. A propulsor as claimed in claim 22 including an additional air intake cooling heat exchanger in which one of working fluids acts as a transport loop from the first and second heat exchangers to exchange heat in the additional heat exchanger with the other one of the cooling fluids.

31. A propulsor as claimed in claim 22 including a heat transport medium in a closed loop with the first and second heat exchangers and an additional heat exchanger, the liquid hydrogen being in heat exchange relationship with the heat transport medium in the additional heat exchanger.

* * * * *